US007518669B2

(12) United States Patent
Jang

(10) Patent No.: US 7,518,669 B2
(45) Date of Patent: Apr. 14, 2009

(54) LCD AND A SHIELD COVER FOR THE LCD

(75) Inventor: Myong Gi Jang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1197 days.

(21) Appl. No.: 10/025,910

(22) Filed: Dec. 26, 2001

(65) Prior Publication Data

US 2002/0180917 A1 Dec. 5, 2002

(30) Foreign Application Priority Data

Jun. 1, 2001 (KR) .............................. 2001-30835

(51) Int. Cl.
*G02F 1/1333* (2006.01)

(52) U.S. Cl. ....................................................... 349/58

(58) Field of Classification Search .................. 349/58, 349/61, 62, 67, 59

See application file for complete search history.

(56) References Cited

U.S. PATENT DOCUMENTS

| | | | | |
|---|---|---|---|---|
| 4,850,228 | A * | 7/1989 | Iizumi | 73/727 |
| 4,950,072 | A * | 8/1990 | Honda | 353/122 |
| 5,179,856 | A * | 1/1993 | Huang | 73/725 |
| 6,020,867 | A * | 2/2000 | Shimada et al. | 345/87 |
| 6,025,644 | A * | 2/2000 | Imaeda | 257/723 |
| 6,025,901 | A * | 2/2000 | Adachi et al. | 349/151 |
| 6,188,568 | B1 * | 2/2001 | Hung et al. | 361/681 |
| 6,388,722 | B1 * | 5/2002 | Yoshii et al. | 349/62 |
| 6,392,626 | B1 * | 5/2002 | Moon | 345/94 |
| 6,636,281 | B1 * | 10/2003 | Kanatsu | 349/58 |
| 6,879,366 | B2 * | 4/2005 | Takeishi et al. | 349/149 |
| 2001/0005240 | A1 * | 6/2001 | Takeishi | 349/58 |

FOREIGN PATENT DOCUMENTS

| | | | |
|---|---|---|---|
| JP | 4-154436 | | 5/1992 |
| JP | 7-239449 | * | 2/1994 |
| JP | 06-265919 | * | 9/1994 |
| JP | 9-34381 | * | 2/1997 |
| JP | 09034381 | * | 2/1997 |
| JP | 9146072 | | 6/1997 |
| JP | 10-161557 | | 6/1998 |
| JP | 11-109318 | | 4/1999 |
| JP | 11-143399 | | 5/1999 |
| JP | 2000-066182 | | 3/2000 |
| KR | 93-11804 | | 6/1993 |

OTHER PUBLICATIONS

Office Action issued by the Chinese Patent Office on Jul. 7, 2006.

* cited by examiner

*Primary Examiner*—Kenneth A Parker
*Assistant Examiner*—Anthony Ho
(74) *Attorney, Agent, or Firm*—McKenna Long & Aldridge LLP

(57) ABSTRACT

An LCD shield cover is provided that can prevent occurrence of defective circuits improve workability in testing and repair, and permit an easy use of a module connector of a PCB. The shield cover for an LCD having a PCB fitted to a rear surface of a display module a shield cover on a top surface of the PCB for shielding the PCB, a module connector connected to a board connector of the system, and a variable resistor VR for optimizing flickering by adjusting a common voltage Vcom, includes a structure in the shield cover at a position over the variable resistor, for adjusting the common voltage and a slit over the modular connector for inserting a board connector.

13 Claims, 2 Drawing Sheets

31a I 1 2 10 31 II 3 20 I II 30 32

LCD AND A SHIELD COVER FOR THE LCD

This application claims the benefit of Korean Patent Application No. 2001-30835, filed on Jun. 1, 2001, the entirety of which is hereby incorporated by reference for all purposes as if fully set forth herein.

BACKGROUND OF THE INVENTION

1. Field of the Invention

The present invention relates to a liquid crystal display, and more particularly, to a shield cover on a top surface of a printed circuit board (PCB) fitted to a rear surface of a liquid crystal display (LCD).

2. Background of the Related Art

The use of an LCD fitted inside the system housing of a portable computer, a monitor, or the like, has increased substantially. This increase in use can be attributed to the fact that the LCD is thin and light in weight, viewing it is less straining to the eyes as compared to cathode ray tubes (CRT) and it has almost no harmful emission of electromagnetic waves.

Typically, the use of an LCD is accomplished by providing an LCD module having a back light part for providing light, a liquid crystal panel part (or display part) fitted on a front surface of the back light part for receiving the light from the back light part in order to present a picture, and a case for the LCD module.

Referring to FIG. 1, a rear part of the LCD 100 includes a printed circuit board (PCB) 10 having a circuit 1 for driving the display module, a module connector 2 for connecting a board connector (not shown) of the system, and a variable resistor 3 for adjusting a common voltage (Vcom) to optimize flickering of picture. The PCB 10 is electrically connected to the liquid crystal panel part (not shown) by TCP (Tape Carrier Package) 20.

Referring to FIG. 2, the LCD 100 is also built in a system housing 210 of a portable computer 200. As shown in FIG. 1, there is a shield cover 30 throughout a top surface of the PCB 10 for shielding contact with the system housing 210. The use of the shield cover 30 prevents the occurrence of defective circuits, such as shorts and the like, caused by direct contact of the PCB 10 with the system housing 210 especially, for example, when the system housing is made of magnesium for the protection from electro magnetic interference (EMI).

However, the related art LCD shield cover 30 has the following problems.

Once fabrication of the LCD 100 is completed by assembling the display module, PCB 10, and the shield cover 30 with the case 40, testing procedures are done to verify the picture displays properly, for example, testing the picture to ensure no flickering is present. If the picture flickers due to incorrect setting of a common voltage (Vcom) to the LCD panel part the worker testing the LCD 100 must disassemble the shield cover 30 from the case 40 in order to adjust the variable resistor 3 thereby adjusting the common voltage (Vcom) to the LCD. In addition, disassembling the shield cover 30 from the case 40 is also required when the LCD 100 is repaired for other reasons. However, the disassembling has a number of disadvantages. For example, it requires additional expense, time, and generally is not a desirable process.

SUMMARY OF THE INVENTION

The present invention is directed to an LCD shield cover that substantially eliminates one or more of the problems due to limitations and disadvantages of the related art.

An advantage of the present invention is to provide an LCD shield cover which can, not only prevent defective circuits, but also improve workability during testing or repair and testing, and in repair permit an easy use of a module connector of a PCB.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the shield cover for an LCD, having a PCB fitted to a rear surface of a display module, a shield cover on a top surface of the PCB for shielding the PCB, the PCB having a circuit for driving the display module, a module connector connected to a board connector of the system, and a variable resistor (VR) for optimizing flickering by adjusting a common voltage (Vcom), the shield cover, includes a covering structure in the shield cover at a position over the variable resistor, for adjusting the common voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to an embodiment of the present invention, an example of which is illustrated in the accompanying drawings.

Figure 1:
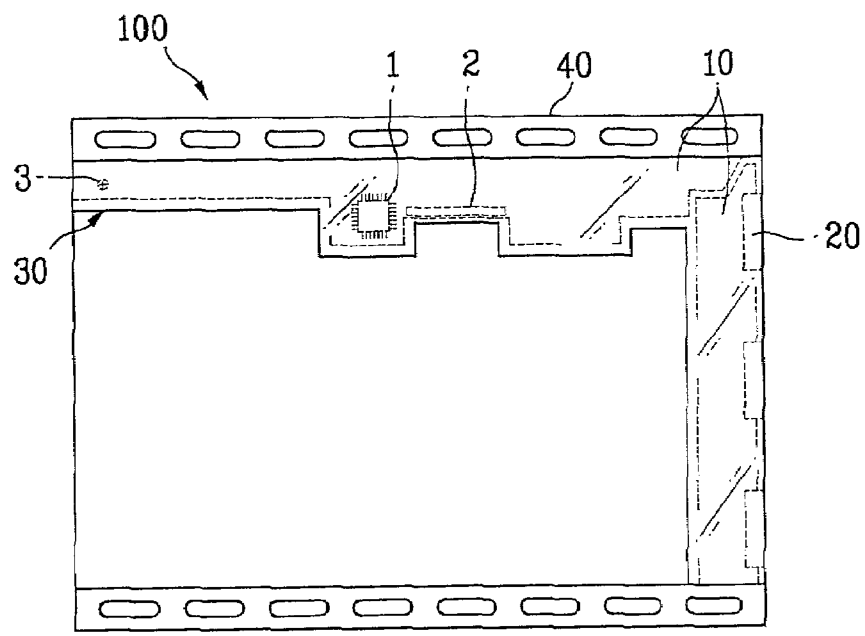
FIG. 1 illustrates a rear view of a related art LCD with shield cover.
Figure 2:
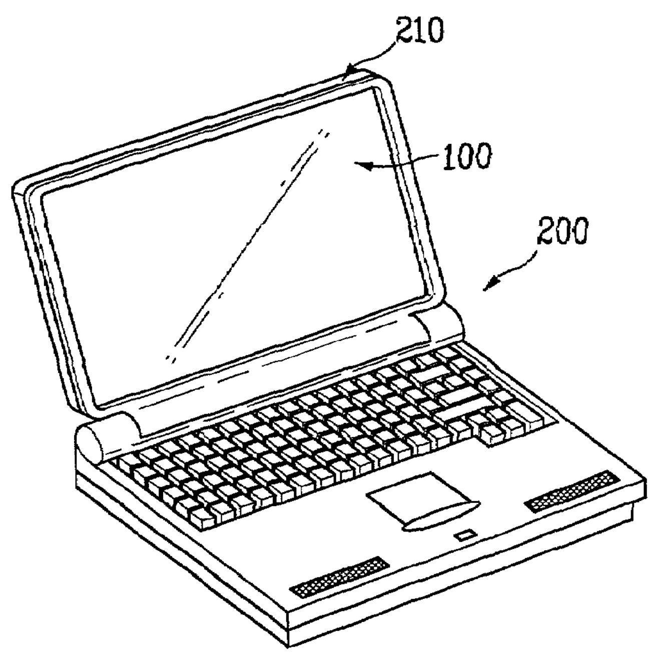
FIG. 2 illustrates a perspective view of a related art portable computer with an LCD.
Figure 3:
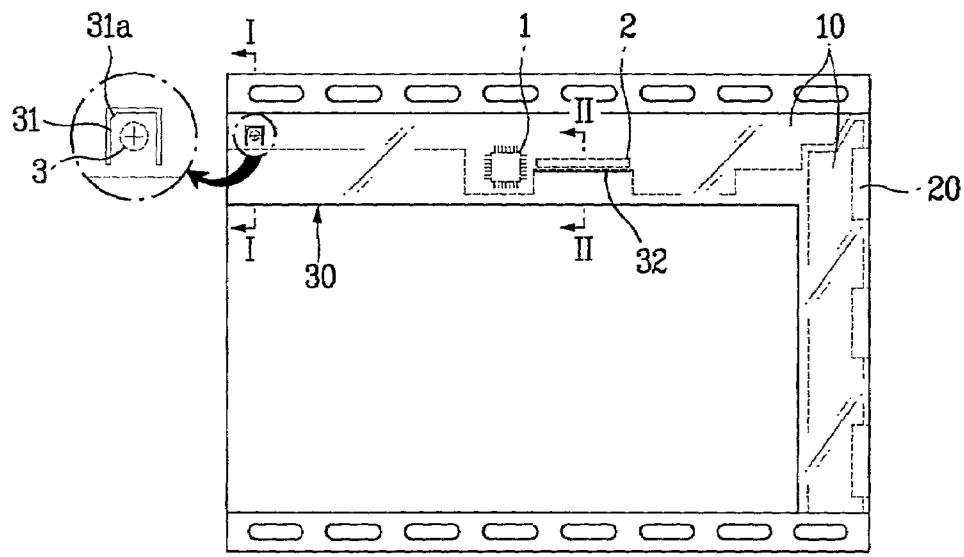
FIG. 3 illustrates a rear view of a LCD with shield cover in accordance with an embodiment of the present invention.

Referring to FIG. 3, the LCD shield cover of the present invention includes a covering structure in the shield cover at a position over a variable resistor (VR) 3. The LCD has a printed circuit board (PCB) 10 fitted to a rear surface of a display module, and a shield cover 30 on a top surface of the PCB for shielding the PCB 10. The PCB has a circuit 1 for driving the display module, a module connector 2 connected to a board connector (220 in FIG. 5) of the system (200 in FIG. 2), and a VR 3 for optimizing flickering by adjusting a common voltage.

Figure 4:
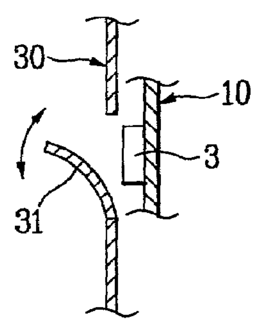
FIG. 4 illustrates a section across line I-I in FIG. 3.

Referring to FIGS. 3 and 4, the shield cover 30 has a flap or opening 31 roughly around the variable resistor 3. The opening can have a shape of an "U" or a "TT" in the shield cover 30. The flap can be opened and closed in the up/down i.e., vertical, direction to allow access to the VR3, as shown in FIG. 4. Referring to the inset of FIG. 3 the flap 31 may have a chamfered portion 31*a* to aid ergonomically in the handling of the flap 31.

Figure 5:
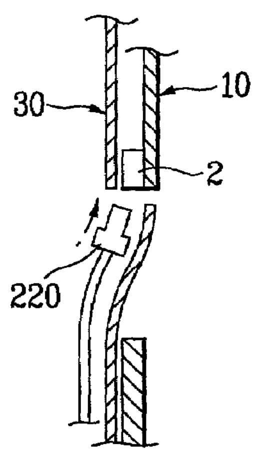
FIG. 5 illustrates a section across line II-II in FIG. 3.

Referring to FIGS. 3 and 5, the LCD shield cover 30 has a deformable portion at the modular connector 2 so that a board connector 220 inserted into the modular connector 2 can be inserted or removed through the shield cover 30. For example, the LCD shield cover 30 has a slit 32 for enabling attaching or detaching the module connector 2 to the system board connector 220, as shown in FIG. 5.

Referring to FIG. 3, the LCD shield cover 30 has a narrow slit above an end position or portion of the module connector 2. When the board connector 220 is inserted in to the module connector 2, the shield cover is displaced, and after the board connector 220 is removed from the module connector 2, the shield cover returns to substantially the original position.

The functions of the opened part 31 and the slit 32 in the shield cover 30 of the present invention will be explained in more detail with reference to FIGS. 3-5.

First, when the chamfered part 31*a* of the flap 31, shown in FIG. 3, is lifted upwardly, the flap 31 can be opened as shown in FIG. 4, this allows a user to adjust the variable resistor 3 thereby adjusting the common voltage (Vcom) in order to stop the picture from flickering. When the adjustment of the variable resistor 3 is finished, the flap 31 returns to an original position by its own elasticity, for example, as the shield cover 30 is formed of a plastic. When the flap 31 is returned to its original position, the cover over the variable resistor 3 cuts off contact between the variable resistor 3 and the system housing 210.

Second, referring to FIG. 5, to insert the system board connector 220 into the module connector 2, the slit 32 is opened as the system board connector 220 depresses the shield cover 30 in the vicinity of the slit 32, as shown in FIGS. 3 and 5. The system board connector is inserted in the module connector 2 through the opened slit 32. When the system board connector 220 is pulled apart from the module connector 2, the shield cover 30 is restored to an original position by its own elasticity, thereby protecting the module connector 2.

The LCD shield cover of the present invention the following advantages.

The flap 31 and the slit 32 in the shield cover of an LCD of the present invention prevents occurrence of defective circuits, such as shorts and the like, improves workability and permits an easy attaching and detaching of the system board connector to and from the module connector. Also, because of its location, the shield cover in the vicinity of the slit 32 is under the system board connector when the board connector is attached or detached from the module connector, as a result scratching at a rear surface of the display module can be prevented.

It will be apparent to those skilled in the art that various modifications and variations can be made in the LCD shield cover of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD), comprising:

a printed circuit board with a variable resistor (VR) that optimizes flickering by adjusting a common voltage (Vcom); and a shied cover covering the printed circuit board with the variable resistor, wherein the shield cover includes a structure arranged over the variable resistor that is openable for adjusting the common voltage, and wherein the structure includes a U-shaped opening in the shield cover around the variable resistor, such that the variable resistor is selectively exposable by the structure.

2. The liquid crystal display as claimed in claim 1, wherein a corner of the structure is chamfered.

3. A liquid crystal display (LCD), comprising:

a printed circuit board with a variable resistor (VR) that optimizes flickering by adjusting a common voltage (Vcom);

a shield cover covering the printed circuit board with the variable resistor;

a module connector formed on the printed circuit board; and a board connector connected with the module connector, wherein the shield cover includes a structure arranged over the variable resistor that is openable for adjusting the common voltage and an opened part arranged over the module connector, wherein the board connector is inserted through the opened part so as to be connected with the module connector.

4. The liquid crystal display as claimed in claim 3, wherein the opened part includes a slit.

5. The liquid crystal display as claimed in claim 4, wherein the slit is arranged over an end of the module connector, wherein the slit is opened when the board connector is connected to the module connector and wherein the slit is closed when the board connector is disconnected from the module connector.

6. A shield cover for a liquid crystal display (LCD), wherein the LCD includes a printed circuit board (PCB) at a rear of a display module, comprising:

a covering structure over the PCB, the covering structure comprising at least one elastically deformable region;

a slit in the covering structure over the PCB; and a variable resistor at the rear of the display module that optimizes flickering by adjusting a common voltage (Vcom), the shield cover further comprising a flap in the covering structure over the variable resistor, wherein the flap includes a chamfered corner portion.

7. A shield cover for a liquid crystal display (LCD), wherein the LCD includes a printed circuit board (PCB) at a rear of a display module, comprising:

a covering structure over the PCB, the covering structure comprising at least one elastically deformable region;

a slit formed in the covering structure over the PCB, wherein the LCD includes a board connector and the board connector is inserted through the slit so as to be connected with the PCB; and a variable resistor formed on the PCB at the rear of the display module that optimizes flickering by adjusting a common voltage (Vcom), the shield cover further comprising a flap in the covering structure over the variable resistor;

wherein the flap is U-shaped.

8. The shield cover of claim 7, wherein the flap includes a chamfered corner portion.

9. A shield cover for a liquid crystal display device having at least one device component, comprising:

at least one elastically deformable region, wherein the at least one device component is selectively exposable by the at least one elastically deformable region;

wherein the at least one device component includes a variable resistor;

wherein the at least one elastically deformable region includes a flap;

wherein the flap is elastically deformable away from the variable resistor to selectively expose the variable resistor;

wherein a corner portion of the flap is chamfered.

10. A shield cover for a liquid crystal display device (LCD) having at least one device component, wherein the LCD includes a printed circuit board (PCB) at a rear of a display module and a board connector connected with the PCB, and wherein the shield cover covers the PCB, comprising:

a slit over the PCB. wherein the board connector is inserted through the slit so as to be connected with the PCB; and at least one elastically deformable region, wherein the at least one device component is selectively exposable by the at least one elastically deformable region;

wherein the at least one elastically deformable region is arranged proximate the slit.

11. The shield cover according to claim 10, wherein the at least one device component includes a module connector arranged on the PCB and wherein the module connector is connectable to the board connector through the slit.

12. The shield cover according to claim 11, wherein the at least one elastically deformable region arranged proximate the slit is elastically deformable toward the modular connector to selectively expose the modular connector.

13. The shield cover according to claim 11, wherein the at least one elastically deformable region arranged proximate the slit is arrangeable beneath the board connector.

* * * * *